United States Patent [19]
Blonski

[11] Patent Number: 5,316,570
[45] Date of Patent: May 31, 1994

[54] STABLE HEAVY METAL FREE ZIRCON PIGMENTS FOR USE IN PLASTICS AND PAINTS AND METHOD FOR COLORING THEREOF

[75] Inventor: Robert P. Blonski, North Royalton, Ohio

[73] Assignee: Ferro Corporation, Cleveland, Ohio

[21] Appl. No.: 951,391

[22] Filed: Sep. 28, 1992

[51] Int. Cl.$^5$ ............................................. C08K 3/00
[52] U.S. Cl. ................................. 106/451; 106/499
[58] Field of Search ............... 106/450, 451, 460, 499; 501/106

[56] References Cited

U.S. PATENT DOCUMENTS

| | | | |
|---|---|---|---|
| 2,992,123 | 7/1961 | Seabright | 106/451 |
| 3,577,252 | 5/1971 | Brugger | 106/450 |
| 3,802,900 | 4/1974 | Broll et al. | 106/451 |
| 3,811,907 | 5/1974 | Scammon, Jr. et al. | 106/450 |
| 4,047,970 | 9/1977 | Morriss et al. | 106/451 |
| 4,711,916 | 12/1987 | Hagiwara et al. | 106/450 |
| 4,752,341 | 6/1988 | Rock | 106/444 |
| 4,767,464 | 8/1988 | Strauch et al. | 106/464 |
| 4,806,507 | 2/1989 | Olby | 106/450 |
| 5,032,556 | 7/1991 | Mori et al. | 501/106 |
| 5,080,718 | 1/1992 | Sullivan et al. | 106/453 |

Primary Examiner—Helene Klemanski
Attorney, Agent, or Firm—Renner, Kenner, Greive, Bobak, Taylor & Weber

[57] ABSTRACT

Stable zircon pigment particles, at least about 50 percent by volume of which range from about 0.2 to about 2.5µ in size, provide useful heavy metal free pigments for plastics and paints. A method for coloring plastic and paint materials without the use of heavy metal pigments comprises the step of adding to the material, in an amount of 0.5 to about 10 percent by weight, stable zircon pigment particles, at least about 50 percent by volume of which range from about 0.2 to about 2.5µ in size.

3 Claims, 5 Drawing Sheets 5,316,570

STABLE HEAVY METAL FREE ZIRCON PIGMENTS FOR USE IN PLASTICS AND PAINTS AND METHOD FOR COLORING THEREOF

TECHNICAL FIELD

The present invention relates to the use of praseodymium doped zircon crystals as a stable, heavy metal free, mixed metal oxide pigment in plastics, paints and other similar applications. More particularly, the invention relates to specification on the particle size distribution of the praseodymium doped zircon powder which yields acceptable color values and hiding powder. It also relates to the use of this powder with a small addition of an organic pigment as a replacement for cadmium and lead bearing yellow, orange and red pigments. Additionally, the present invention provides a method for coloring plastics and paints.

BACKGROUND ART

With the growing concern concerning the disposal of articles containing heavy metals it is highly desirable to develop inorganic pigments which are heavy metal free. Historically, inorganic pigments for plastic and paint applications in the yellow to red range have included CdS-CdSe, lead molybdate-lead antimonate, and iron oxide pigment families. The former two contain elements which are classified as "heavy metals" and their use is being stringently regulated. The iron oxide pigments are somewhat acid soluble and therefore cannot be used in all applications.

The use of praseodymium doped zirconium silicate (zircon) crystals as a pigment for use in ceramic glazes was disclosed by C. A. Seabright in U.S. Pat. No. 2,992,123. Since that time there have been numerous patents issued for praseodymium doped zircon for ceramic applications and it is now manufactured worldwide for ceramic applications. The application of this pigment to non-ceramic applications such as in plastics and paints has previously not been disclosed.

The importance of the crystal size of a pigment and the particle size distribution of the pigment powder to the performance of the pigment is well known in the industry. The physics of the optics of small particles can be found, for example, in the book "Absorption and Scattering of Light by Small Particles", by C. F. Bohren and D. R. Hufman, John Wiley and Sons, 1983. In U.S. Pat. No. 4,752,341, S. L. Rock discloses the importance of the particle size of the zeolite when used as a pigment with titanium dioxide in paper. In U.S. Pat. No. 4,767,464, Strauch et al. disclose the importance of the particle size distribution of carbonates used as fillers or pigments in dyes, paints, paper or plastics.

None of the foregoing technology describes stable, heavy metal free zircon pigments having a uniform distribution of particle size, allowing the pigment to be used for coloring plastics and paints.

DISCLOSURE OF THE INVENTION

It is therefore an object of the present invention to provide a particle size distribution of zircon pigments that is uniform and correctly sized to be useful in coloring plastics and paints.

It is yet another object of the present invention to provide a zircon based pigment that can be utilized to provide yellow, orange, red, coral and blue colors for plastics and paints.

It is yet another object of the present invention to provide a heavy metal free zircon based pigment that can be utilized to provide colors to plastics and paints.

It is yet another object of the present invention to provide a zircon based pigment that can be utilized with lesser amounts of organic pigments to provide colors for plastics and paints that withstand use in hostile environments.

It is another object of the present invention to provide a zircon based pigment having a particle size ranging from about 0.5 to 3$\mu$ that can be utilized to provide colors for plastics and paints.

It is yet another object of the present invention to provide a method for coloring plastics and paints without the use of heavy metals to impart colors such as yellow, oranges, red, corals and blue.

It is still another object of the present invention to provide a method for coloring plastics and paints involving the use of zircon based pigments having a small and uniform particle size distribution.

It is yet another object of the present invention to provide a method for coloring plastics and paints involving the use of zircon based pigments with lesser amounts of organic pigments.

At least one or more of the foregoing objects, together with the advantages thereof over zircon pigments and methods for coloring plastics and paints, which shall become apparent from the specification which follows, are accomplished by the invention as hereinafter described and claimed.

In general, the present invention provides stable pigment particles comprising zircon particles, at least about 50 percent by volume of which range from about 0.2 to about 2.5$\mu$ in size.

The present invention provides a method for coloring plastic and paint materials without the use of heavy metal pigments comprising the step of adding to said material, in an amount of 0.5 to about 10 percent by weight, stable zircon pigment particles, at least about 50 percent by volume of which range from about 0.2 to about 2.5$\mu$ in size.

Several exemplary embodiments of zircon pigments have been provided and are deemed sufficient to effect a full disclosure of the subject invention without attempting to show all of the various forms and modifications in which the invention might be embodied; the invention being measured by the appended claims and not by the details of the specification.

PREFERRED EMBODIMENT FOR CARRYING OUT THE INVENTION

Figure 1:
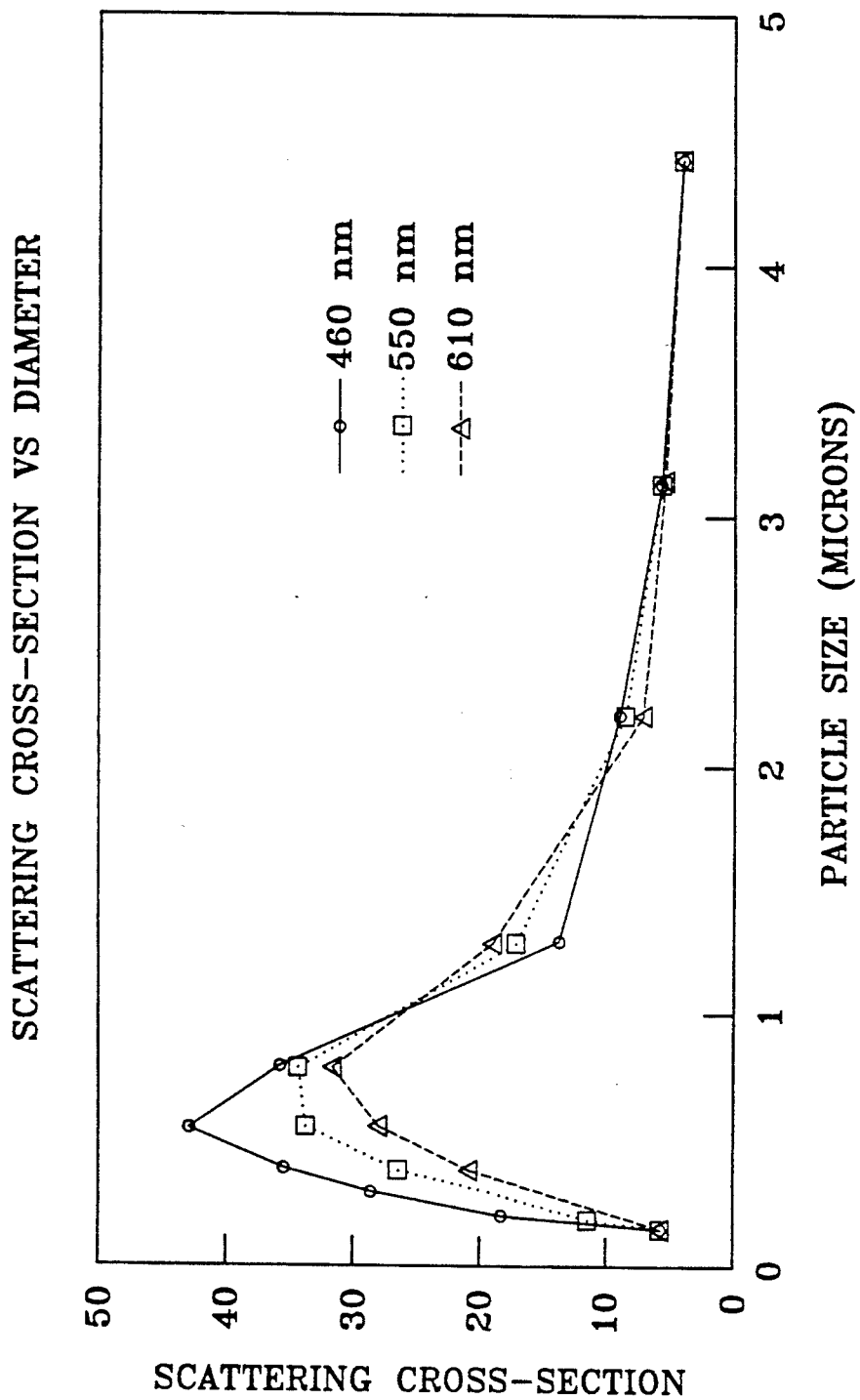
FIG. 1 is a graph depicting the relationship between light scattering and particle size.

The present invention provides particle size distribution specifications for praseodymium doped zircon powders that allow this type pigment to be used in plastic and paint applications. This pigment is especially useful in hostile environments, that is, where high levels of acidity or alkalinity occur or high temperatures. The present invention also allows the color of this pigment to be enhanced with the addition of a small amount of an organic pigment.

The doping level of praseodymium in the zirconium silicate (zircon) crystal used as the pigment in this invention can lie in the range of 0.5 to 15 percent by weight and preferably in the range of 3 percent to 10 percent by weight. The pigment can be synthesized by any of the methods known in the art. Conventionally produced crystals can be ground to the specific particle size taught by the present inventor or, the particle size and crystal structure can be pre-determined prior to manufacture by introduction of a template material to a mixture of the appropriate mixed metal oxides which are then fired to produce the zircon pigment. The use and description of template materials is disclosed in copending application U.S. Ser. No. 07/756,158, the subject matter of which is incorporated herein by reference.

The preferred powders are praseodymium doped zircons which provide a yellow pigment. By varying the composition of the powder, as is known, the zircons can provide a variety of yellows, reds, oranges, corals, and blues. In addition to the use of the zircon powder alone, it is also possible to employ small amounts of known organic pigments to enhance or vary the original color of the zircon pigment. While it is known to utilize such organic pigments as a substitute for the heavy metal pigments, they are considerably more expensive. Accordingly, an advantage of the present invention is that the amount of organic pigment can be significantly reduced, to the point of elimination, by use of the zircon pigments of the present invention, correctly sized.

Typical organic pigments that can be employed include a commercially available yellow pigment from Hoechst, available as H4G, which is a bright yellow pigment suitable for plastic applications. Any other commercially available organic pigments recommended by their manufacturers for use in a given application can be used.

The organic pigments, when present, can be employed in amounts ranging from about 0.005 to about 2 percent by weight, with zircon particles of the present invention in amounts of up to about 10 percent by weight. Any combination of two or more pigments and amounts thereof is within the scope of the present invention and can be varied to suit the requirements of the particular application.

Praseodymium doped zircon is used extensively in ceramics applications because of its pleasant bright yellow color and because it is quite stable in ceramic glazes and bodies. In a ceramic application the particle size of the pigment typically lies in the range of about 7.0 to 14.0$\mu$ (MV). However, if this pigment is used in a plastic application, the resulting sample is very translucent, the reason for this being that the index of refraction of zircon is about 1.96 (Handbook of Chemistry and Physics, Weast ed., The Chemical Rubber Company, Cleveland, Ohio 44128). As noted hereinabove, the present invention provides that the preferred particle size distribution is such that at least 50 percent by volume of the particles shall fall within a range of from about 0.2 to about 2.5$\mu$.

The amount of light reflected (scattered) by a particle in a media is a function of the particles' size and the difference in the index of refraction of the particle and the media. An estimate of the scattering power of a material can be made by using the following formula for the amount of electromagnetic radiation reflected at normal incidence at the planar boundary between two dielectrics with indices of refraction N1 and N2 (Introduction of Electromagnetic Fields and Waves, D. R. Corson and P. Lorrain, W. H. Freeman and Company, San Francisco, Calif., 1962, page 371):

$$R = \frac{(N1 - N2)^2}{(N1 + N2)^2}$$

The value of this parameter for zircon in a media which has an index of refraction of 1.5, which is typical for paints and plastics is, 0.0176. For comparison this value for titanium dioxide (Index of Refraction=2.76) is 0.0875. Thus titania, which is regarded as an excellent pigmentary base, scatters radiation approximately 5 times better than zircon. Because zircon is such a poor scatterer, it is imperative that the particle size distribution of the pigment be such to use the maximum amount of scattering that is possible.

In order to determine the dependence of scattering on particle size a calculation was made using Mie Scattering Theory. The calculation followed closely that described in the book "Absorption and Scattering of Light by Small Particles" by Bohren and Huffman and by the computer program contained in Appendix A of their book. FIG. 1 herein provides a graph of this calculation. The data shown indicates that particles having a diameter of between about 0.5 and 1.0 $\mu$ scatter with the highest efficiency, while particles having a diameter over about 2.5 $\mu$ scatter very poorly.

In order to determine whether a zircon pigment with a substantial portion of the particles lying in the range of 0.2 to 2.5 $\mu$ as identified above, would have good pigmentary properties, a quantity of a commercial praseodymium doped zircon pigment (C-416, Ferro Corporation, Cleveland, Ohio) was ground to various particle size distributions and evaluated at a 2 percent by weight loading level in polypropylene chips, 2 mm thick. The pigments were shaker milled in water using 1.5 mm diameter zirconia beads as media. Table I lists the resulting particle size distributions for these pigments (Example Nos. 1 through 7). A separate example, No. 8 was prepared by the use of a template material which provides among other results a uniform distribution of small pigment particles, also reported in Table I. A more detailed description of syntheses via template materials is provided in U.S. Ser. No. 07/756,158, the subject matter of which is incorporated herein by reference. It is to be understood that practice of the present invention is not limited to the method described therein or any particular means for obtaining the particle sizes claimed therein.

Table II lists the colorometric data from the 2 mm thick pigmented polypropylene chips of Example Nos. 1-7. The data was taken over a white and a black background in order that the hiding of the pigments could be evaluated. The data was taken using a Match Scan Colorimeter CIELAB unit, Iluminent C, and the 1931 CIE 2 Degree Standard Observer. Hiding power is defined as the ratio of the samples Y value over black (Yb) divided by its Y value over white (Yw).

TABLE I

MICROTRAC PARTICLE SIZE DISTRIBUTIONS

| Example | MV | 84%< | 50%< | 16%< |
|---|---|---|---|---|
| 1 | 9.11 | 14.09 | 8.34 | 4.52 |
| 2 | 7.13 | 10.97 | 6.57 | 3.46 |
| 3 | 4.42 | 7.18 | 4.10 | 1.56 |
| 4 | 2.50 | 4.32 | 2.24 | 0.77 |
| 5 | 1.73 | 3.07 | 1.46 | 0.58 |
| 6 | 1.26 | 2.21 | 1.01 | 0.48 |
| 7 | 1.02 | 1.65 | 0.86 | 0.42 |
| 8 | 1.64 | 2.76 | 1.42 | 0.62 |

TABLE II

COLOROMETRIC VALUES OF 2% PRASEODYMIUM DOPED ZIRCON IN POLYPROPYLENE CHIPS

| Example | Over White | | | Over Black | | | Hiding |
|---|---|---|---|---|---|---|---|
|  | $L^*$ | $a^*$ | $b^*$ | $L^*$ | $a^*$ | $b^*$ | Yb/Yw |
| 1 | 74.28 | −8.71 | 70.14 | 65.14 | −10.28 | 55.82 | 0.877 |
| 2 | 76.94 | −8.64 | 71.29 | 68.40 | −10.60 | 58.58 | 0.889 |
| 3 | 79.60 | −9.16 | 65.10 | 73.55 | −11.24 | 55.56 | 0.924 |
| 4 | 83.84 | −9.62 | 64.30 | 79.87 | −11.89 | 56.72 | 0.953 |
| 5 | 86.12 | −9.76 | 62.76 | 82.28 | −12.13 | 56.48 | 0.955 |
| 6 | 87.32 | −9.74 | 60.43 | 83.68 | −12.15 | 54.63 | 0.958 |
| 7 | 88.34 | −9.59 | 59.46 | 84.96 | −12.03 | 53.92 | 0.962 |

$L^*$ lightness 100 light, 0 dark
$a^*$ red - green
$b^*$ yellow - blue

Figure 2:
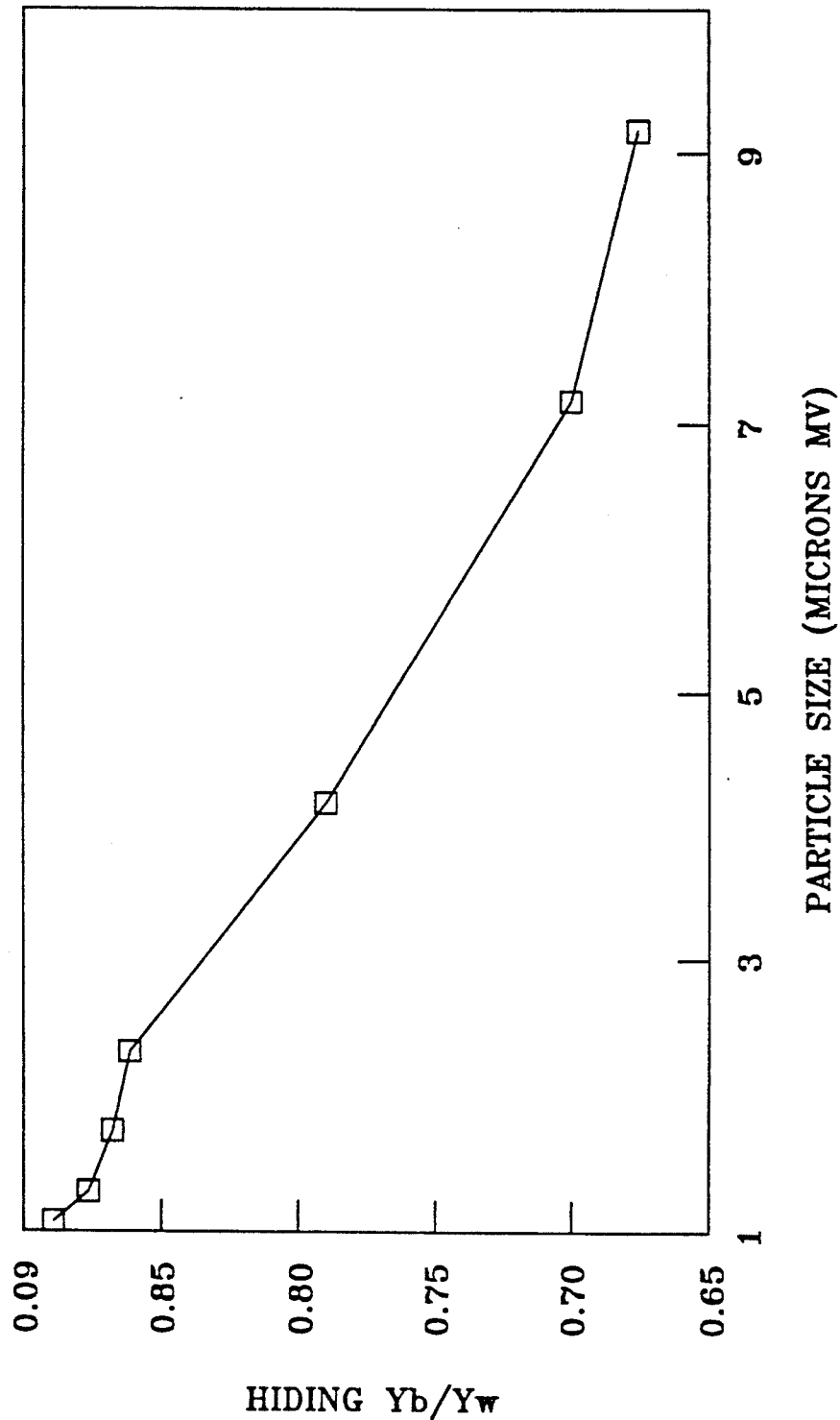
FIG. 2 is a graph depicting hiding versus mean particle diameter.
Figure 3:
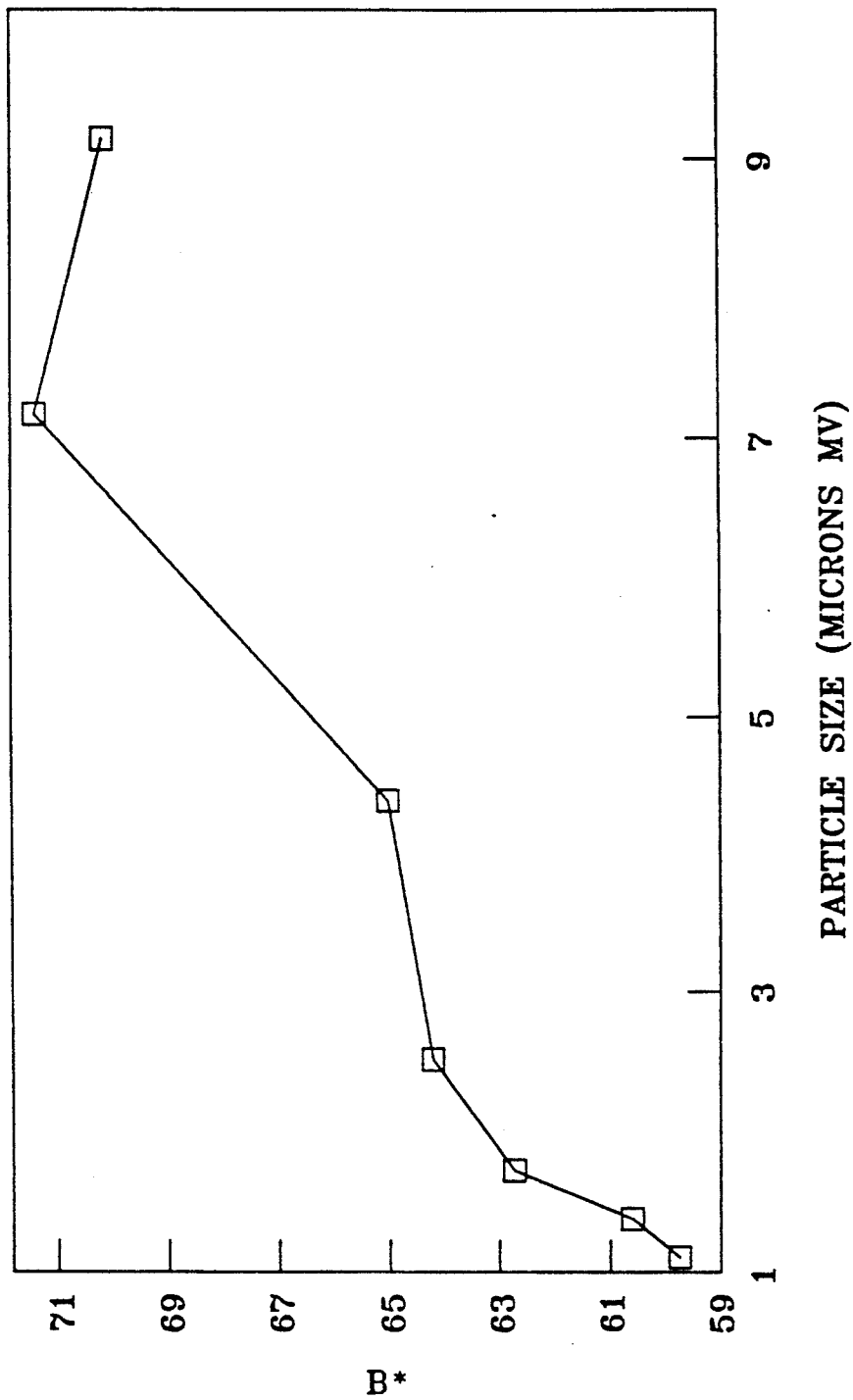
FIG. 3 is a graph depicting the relationship between B* value and particle size for a praseodymium doped zircon pigment at a 2 percent loading.

FIGS. 2 and 3 provide graphical presentations of the data included in Table II. FIG. 2 shows the dependence of hiding power on the mean particle diameter (MV) of the pigment. At a value of about 2.5 μ the hiding power of the pigment is within 5 percent of the maximum measured and falls off rapidly below that value. FIG. 3 shows the dependence of the B* value of the sample, which is a quantitative measure of the "yellow" value of the pigment, on particle size. This data shows that the B* value decreases with decreasing particle size, dropping dramatically at particle sizes below about 1.5 μ. The size distribution of a praseodymium doped zircon pigment for plastic or paint applications must be balanced between that giving maximum opacity without losing too much color from the addition of the extra scattering from the zircon particles.

Figure 4:
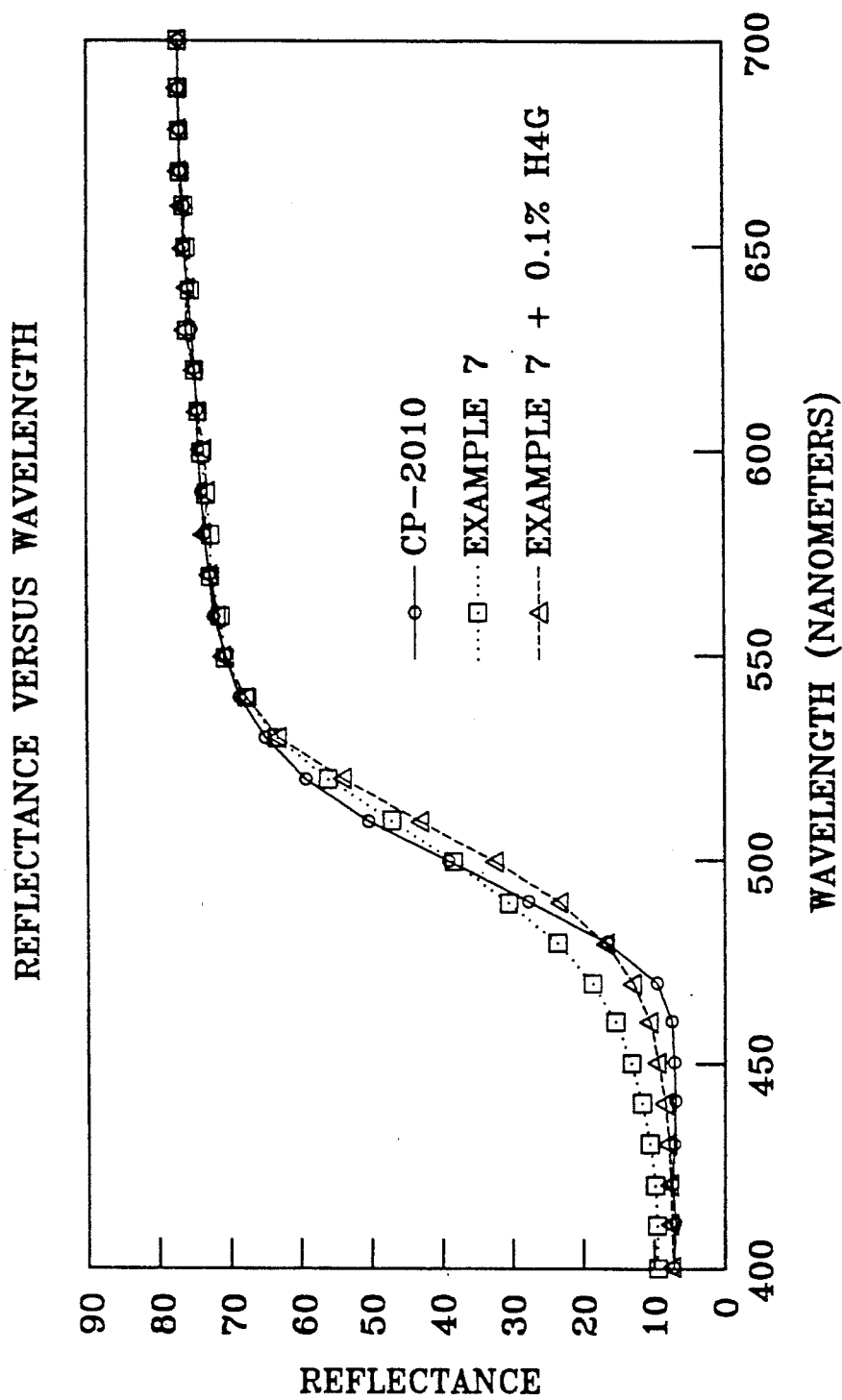
FIG. 4 is a graph of the reflectance of polypropylene chips over a white background of a commercial CdS pigment at a 0.5% loading and a praseodymium doped zircon pigment at a 2 percent loading and; a praseodymium doped pigment at 0% loading plus 0.1% of an organic yellow pigment (H4G)

FIG. 4 is a graph depicting the reflectance of polypropylene chips over a white background of a commercial CdS pigment (CP2010, Ferro Corporation) at a 0.5 percent loading and a praseodymium doped zircon pigment (MV=1.64 μ, Ex. 8) at a 2 percent loading. It will be noted that the curves are close for wavelengths above about 480 nanometers. By adding a small amount of an organic pigment to a praseodymium doped zircon pigment, to add a small amount of absorption in the 400 to 480 nanometer range, the bright, clean color of a Cadmium Sulfide pigment can be matched.

The foregoing results established that the particle size of the zircon pigments, useful for plastic and paint materials is between 0.5 and 3 μ. The particle size distribution is specified on the basis of values obtained from measurements made with a Leeds and Northrup Microtrac Particle Size Analyzer. Values that are specified are Mean Value by Volume (MV), and the value below which lie 50 percent of the particles. For applications in plastics and paints the Mean Value (MV) of the pigment powder should be between the values of 0.5 and 3 μ and preferably between 1.2 and 2.6 μ. Also 50 percent of the particles should lie below 3.5 μ and preferably below 2.5 μ.

Figure 5:
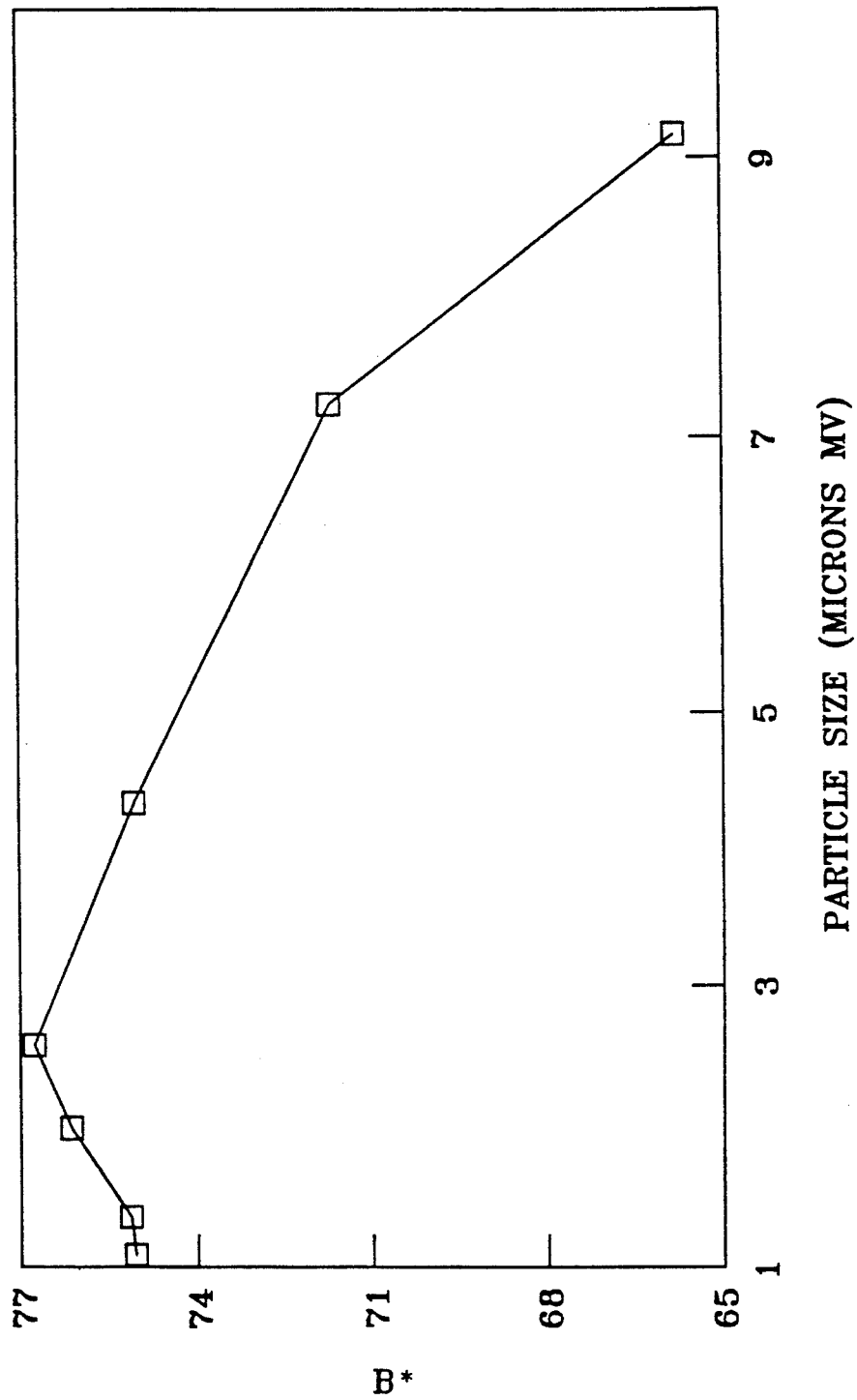
FIG. 5 is a graph depicting the relationship between B* value and particle size for a praseodymium doped zircon pigment with an organic pigment.

In order to demonstrate that the disclosed range of particle sizes yields optimum performance, another set of polypropylene chips was made using the pigments of Example Nos. 1 through 7, this time including the addition of 0.1 percent of a commercial yellow organic pigment (H4G, Hoechst). Data for this series is presented in Table III. FIG. 5 provides a graph of the yellow value for a sample as a function of the mean particle size (MV). This graph shows that the most efficient use of the organic pigment to enhance the value of a sample occurs in the pigments which have a particle size distribution falling within the range disclosed herein.

TABLE III

COLOROMETRIC VALUES OF 2% PRASEODYMIUM DOPED ZIRCON PLUS 0.1% H4G ORGANIC YELLOW PIGMENT POLYPROPYLENE CHIPS

| Example | Over White | | | Over Black | | | Hiding |
|---|---|---|---|---|---|---|---|
|  | $L^*$ | $a^*$ | $b^*$ | $L^*$ | $a^*$ | $b^*$ | Yb/Yw |
| 1 | 70.74 | −5.24 | 65.43 | 65.27 | −8.64 | 56.29 | 0.785 |
| 2 | 74.80 | −5.09 | 71.50 | 69.16 | −8.83 | 62.22 | 0.790 |
| 3 | 78.89 | −5.63 | 74.89 | 74.16 | −9.31 | 67.19 | 0.831 |
| 4 | 82.23 | −6.37 | 76.60 | 78.52 | −9.75 | 70.58 | 0.871 |
| 5 | 82.94 | −7.00 | 76.02 | 79.23 | −10.40 | 70.12 | 0.872 |
| 6 | 83.27 | −6.93 | 74.89 | 80.14 | −10.12 | 69.63 | 0.891 |
| 7 | 84.22 | −6.94 | 74.87 | 81.07 | −10.20 | 69.99 | 0.891 |

$L^*$ lightness 100 light, 0 dark
$a^*$ red - green
$b^*$ yellow - blue

In order to test the chemical stability of the disclosed pigment the following test was conducted. Polypropylene chips containing 0.25 percent of a commercial cadmium sulfide pigment (CP2010, Ferro Corporation), 0.1 percent of a commercial organic yellow pigment (H4G, Hoeschst) or 2 percent praseodymium doped zircon (Example 8) were immersed in a supersaturated solution of a commercial swimming pool chlorine compound (Sun Brand Granular Stabilized Chlorinating Concentrate) for a period of two months. Table IV contains the result of this test. Both the CdS pigment and organic pigment degraded significantly while the praseodymium doped zircon pigment maintained its hiding and color properties.

TAVLE IV

COLOROMETRIC VALUES OF POLYPROPYLENE BEFORE AND AFTER A TWO MONTH IMMERSION IN CONCENTRATED POOL CHLORINATING CHEMICALS

| | Over White | | | Over Black | | | Hiding |
|---|---|---|---|---|---|---|---|
| | $L^*$ | $a^*$ | $b^*$ | $L^*$ | $a^*$ | $b^*$ | Yb/Yw |
| 0.25% CP2010 | | | | | | | |
| Initial | 87.06 | −18.55 | 87.69 | 78.98 | −21.69 | 75.93 | 0.747 |
| Final | 84.54 | −18.67 | 68.00 | 71.67 | −19.03 | 49.08 | 0.609 |
| 0.1 H4G | | | | | | | |
| Initial | 80.59 | −11.12 | 86.00 | 67.46 | −16.63 | 65.57 | 0.586 |
| Final | 80.90 | −12.75 | 79.01 | 66.11 | −16.83 | 55.72 | 0.546 |
| 2.0% Example 8 | | | | | | | |
| Initial | 84.13 | −9.14 | 66.00 | 80.34 | −11.48 | 59.93 | 0.871 |
| Final | 85.72 | −9.39 | 67.54 | 81.38 | −11.90 | 60.16 | 0.856 |

Thus, it should be apparent to those skilled in the art that the use of pigment particles, sized according to the present invention, will provide stable, heavy metal-free pigments for plastics and paints. Similarly, the selection of components to form mixed metal oxide pigments can readily be made within the total specification disclosure.

It is, therefore, to be understood that any variations evident fall within the scope of the claimed invention and thus, the selection of specific metal oxide pigments and optional organic pigments for use therewith can be determined without departing from the spirit of the invention herein disclosed and described. Moreover, the scope of the invention shall include all modifications and variations that may fall within the scope of the attached claims.

What is claimed is:

1. Stable pigment particles comprising: praseodymium doped zirconium silicate particles, at least about 50 percent by volume of which range from about 0.2 to about 2.5 $\mu$ in size.

2. A method for coloring plastic and paint materials without the use of heavy metal pigments comprising the step of:
adding to the material, in an amount of 0.5 to about 10 percent by weight, stable praseodymium doped zirconium silicate pigment particles, at least about 50 percent by volume of which range from about 0.2 to about 2.5 $\mu$ in size.

3. A method for coloring plastic and paint materials, as set forth in claim 2, including the additional step of adding to said material from about 0.005 to about 2 percent by weight of an organic pigment.

* * * * *